(12) United States Patent
Ehler

(10) Patent No.: US 7,771,154 B2
(45) Date of Patent: * Aug. 10, 2010

(54) VEHICLE RAMP SYSTEM

(76) Inventor: Bradley Dean Ehler, 6608 Pilot Peak Rd., Laramie, WY (US) 82070

( * ) Notice: Subject to any disclaimer, the term of this patent is extended or adjusted under 35 U.S.C. 154(b) by 0 days.

This patent is subject to a terminal disclaimer.

(21) Appl. No.: 11/709,479

(22) Filed: Feb. 21, 2007

(65) Prior Publication Data

US 2007/0160450 A1 Jul. 12, 2007

Related U.S. Application Data

(63) Continuation of application No. 10/841,679, filed on May 6, 2004, now Pat. No. 7,186,069.

(51) Int. Cl.
*B60P 1/43* (2006.01)
*B62D 33/03* (2006.01)

(52) U.S. Cl. .................. 414/538; 414/813; 296/61

(58) Field of Classification Search .............. 296/61; 414/538, 813
See application file for complete search history.

(56) References Cited

U.S. PATENT DOCUMENTS

| | | | |
|---|---|---|---|
| 2,704,191 A | 3/1955 | Schley et al. | |
| 3,658,196 A | 4/1972 | Schmitt | |
| 3,756,440 A * | 9/1973 | Raap et al. ................. | 414/537 |
| 4,068,770 A | 1/1978 | Boehringer | |
| 4,590,634 A * | 5/1986 | Williams .................... | 14/71.1 |
| 4,668,002 A | 5/1987 | Hanson | |
| 4,997,331 A | 3/1991 | Grinsted et al. | |
| 5,312,149 A * | 5/1994 | Boone ......................... | 296/61 |
| 5,380,145 A * | 1/1995 | Czaplewski ................. | 414/537 |
| 5,509,775 A | 4/1996 | Kendall | |
| 5,538,307 A | 7/1996 | Otis | |
| 6,176,674 B1 | 1/2001 | Meeks et al. | |
| 6,454,338 B1 * | 9/2002 | Glickman et al. .......... | 296/57.1 |
| 6,561,746 B1 | 5/2003 | Broussard et al. | |
| 6,634,849 B2 | 10/2003 | Clary | |
| 6,698,994 B2 | 3/2004 | Barrett | |
| 6,749,246 B2 * | 6/2004 | Landwehr .................... | 296/61 |
| 6,811,067 B2 * | 11/2004 | Muizelaar et al. ........... | 224/404 |
| 2002/0081184 A1 | 6/2002 | Sternberg | |
| 2003/0082035 A1 | 5/2003 | Broussard et al. | |

OTHER PUBLICATIONS

U.S. Appl. No. 10/841,679, entitled "Vehicle Payload Conveyance System", filed May 6, 2004.

* cited by examiner

*Primary Examiner*—James Keenan
(74) *Attorney, Agent, or Firm*—Craig R. Miles; CR Miles, P.C.

(57) ABSTRACT

A vehicle payload conveyance system located inside the hollow of a vehicle gate which provides ramps which deploy from the hollow by rotation about the axis of a ball slidly engaged in a track to allow the ramps to be positioned for the loading and unloading of a payload into or out of the vehicle, and further provides a line deployed from the hollow of the vehicle gate which can be attached to the payload and adjustably tensioned to facilitate transfer of a payload into or out of the vehicle.

24 Claims, 8 Drawing Sheets

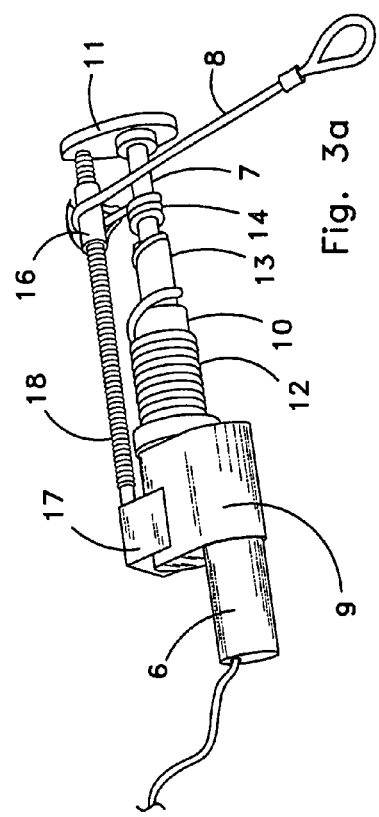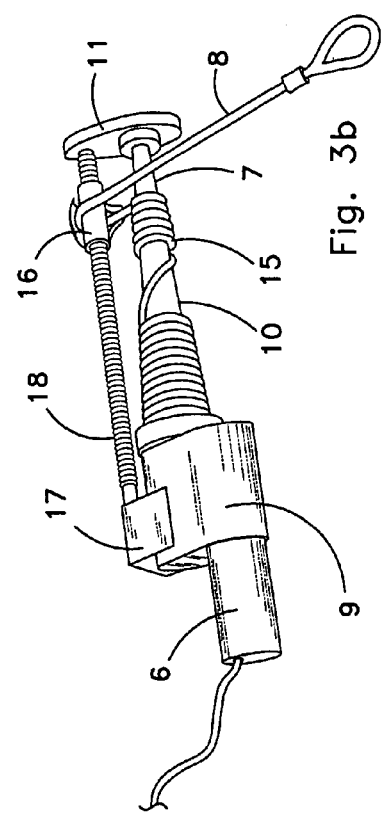
Fig. 3

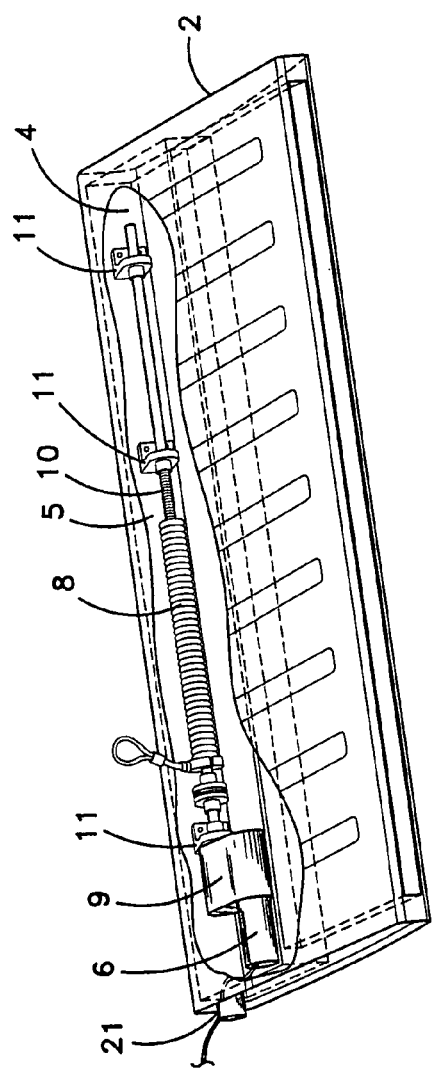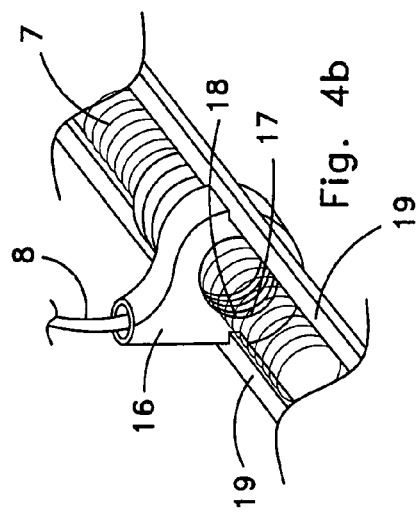
Fig. 4a
Fig. 4b
Fig. 4

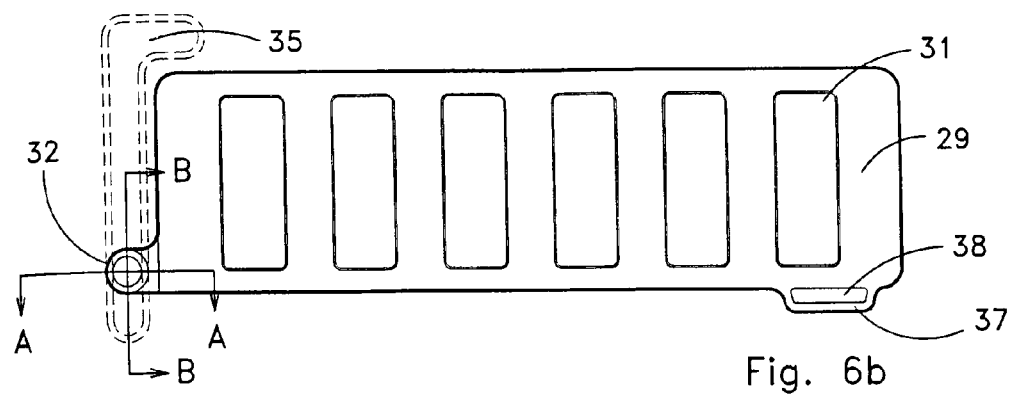
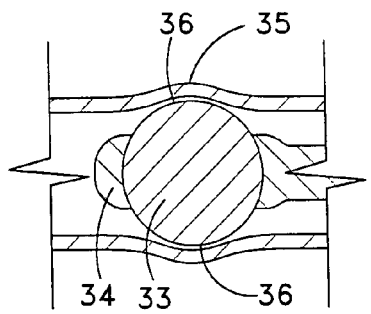
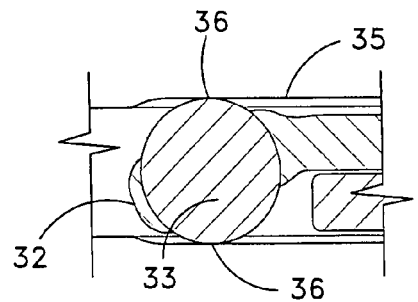
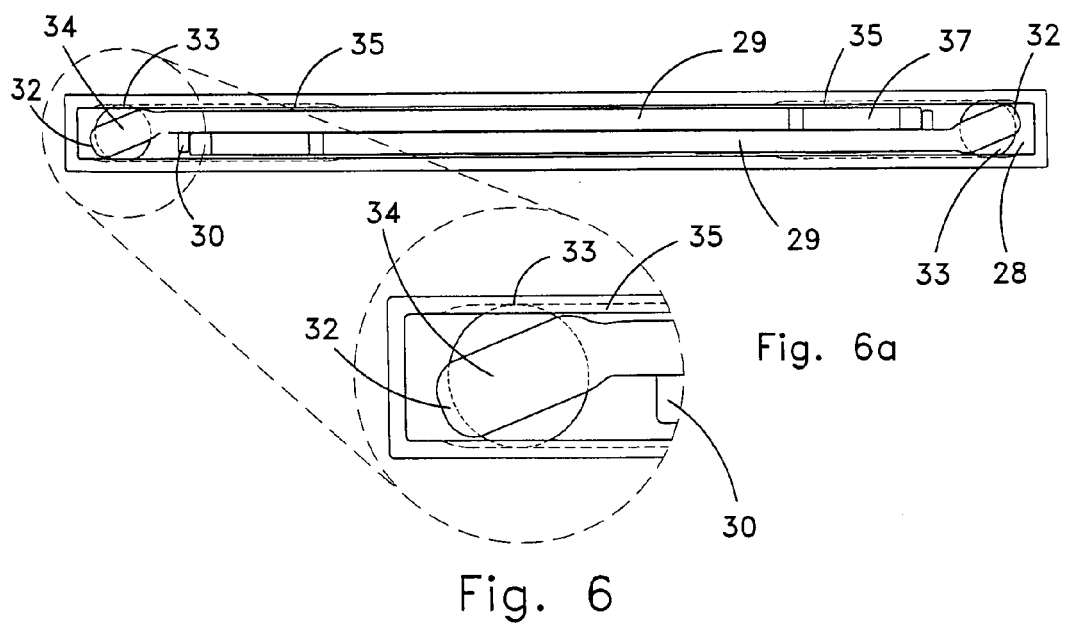
Fig. 6

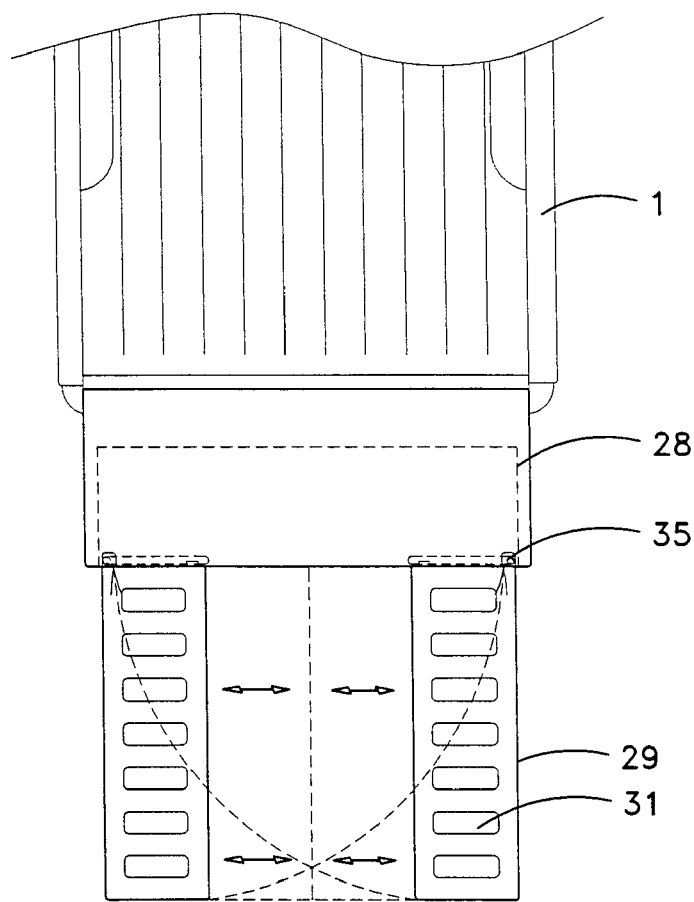
Fig. 8a
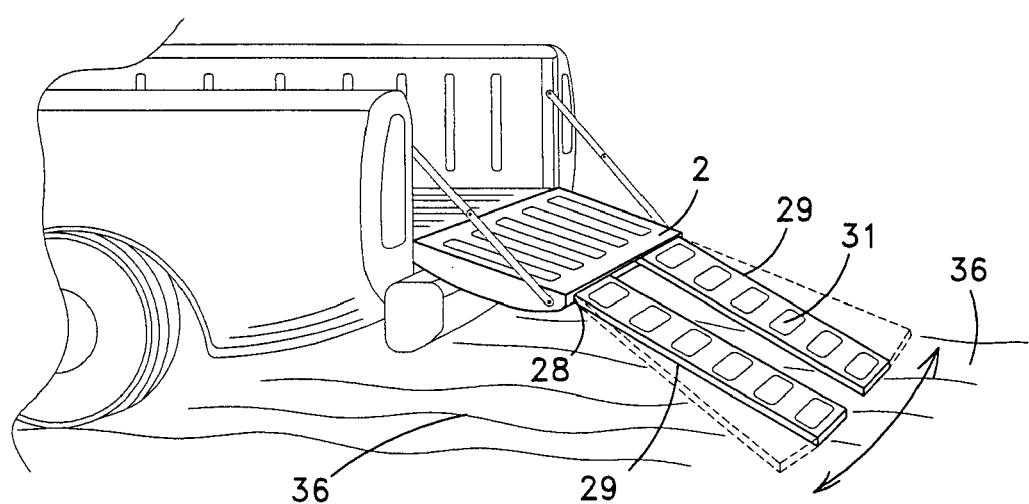
Fig. 8b
Fig. 8

VEHICLE RAMP SYSTEM

This United States Patent Application is a continuation of U.S. patent application Ser. No. 10/841,679, filed May 6, 2004, now issued as U.S. Pat. No. 7,186,069, hereby incorporated by reference herein.

I. BACKGROUND

A vehicle payload conveyance system located inside the hollow of a vehicle gate which provides ramps which deploy and can be positioned for the loading and unloading of a payload into or out of the vehicle, and can further provide a cable deployed from the hollow of the vehicle gate which can be attached to the payload and adjustably tensioned to facilitate transfer of a payload into or out of the vehicle.

With the advent of sport utility vehicles and light utility vehicles, a larger portion of the general public is driving a vehicle which can be used to transport a payload of substantial weight. New sport utility vehicles and light utility trucks sit atop super-strong steel frames which allow the vehicles to carry a payload of in excess of 1,500 pounds. Additionally, certain new model sport utility vehicles and light trucks can tow in excess of 7,000 pounds.

Not unexpectedly, given the opportunity to transport and tow more substantial payloads, almost half of all persons who own a sport utility vehicle or light truck use it for towing and transporting payloads of substantial weight such as boats, off road vehicles, motorcycles, personal watercraft, all terrain vehicles, dirt bikes, or the like.

A substantial problem with sport utility vehicles, light trucks, and vehicles in general can be that the vehicle provides the opportunity to transport a heavy payload (typically between 1,000 pounds and 7,000 pounds) but is not sold with any devices for assisting the owner with loading and unloading a heavy payload from the vehicle. In the first instance, the vehicle may not come equipped with ramps which can be deployed to establish a grade on which the payload can be moved into or out of the vehicle. In the second instance, the vehicle may not come equipped with a cable that can be tensioned to assist in moving the payload onto or off from a trailer or in moving the payload on a ramp into or out of the vehicle.

Additionally, aftermarket winches and ramps may not be configured to operate for the narrow purpose of moving payloads within weight range specified for sport utility vehicles or light trucks. As such, aftermarket equipment may have excess capacity that is seldom or may not be utilized. Also, aftermarket equipment generically configured to fit all vehicles, may not mount in a location useful for loading and unloading of payloads into or out of the various models of sport utility or light utility vehicles.

Another substantial problem with sport utility vehicles in particular and in general with all vehicles can be that no provision is made for the storage of equipment such as power winches and ramps. As such, power winches are mounted as an after market device typically to the front of the vehicle. Ramps are purchased and stowed in the garage, the bed of the vehicle, or occupy a portion of the cabin space.

The instant invention provides a vehicle payload conveyance system which addresses each of the above-described problems.

II. SUMMARY OF THE INVENTION

Accordingly, a broad objective of the invention can be to provide a vehicle payload conveyance system to facilitate transfer of a payload from inside the vehicle to outside the vehicle, or from outside of the vehicle to inside of the vehicle.

Another broad objective of the invention can be to provide a vehicle payload conveyance system to facilitate transfer of a payload onto or off from a trailer towed by the vehicle.

Another significant object of the invention can be to provide a line adjustment means to play out and retract a line such as cable, cord, wire, or the like, located inside the hollow of a gate of a vehicle.

Another significant object of the invention can be to provide a line guidance means which guides the cable, cord, wire, or the like, onto the surface it is wound to provide the desired number of windings per unit distance.

Another significant object of the invention can be to provide a surface on which the cable, cord, wire, or the like configured to operate with the line guidance means above-described to adjust the speed at which the line is played out or retracted or to adjust the transmission of power to the line as it is played out or retracted.

Another significant object of the invention can be to control the line adjustment which plays out and retracts the line to facilitate controlled movement of payloads being loaded or unloaded from the vehicle.

Another significant object of the invention can be to provide one or more ramps which are stowed inside the gate which can be deployed from within the gate to be used in conjunction with the line adjustment means.

Another significant object of the invention can be to provide a ramp pivot which travels within a track which affords a wide range of movement in positioning the ramp with regard to various support surfaces and in positioning the ramp to be used as an extension of the gate without the aide of a support surface.

Naturally, further objects of the invention are disclosed throughout other areas of the specification, drawings, and claims.

III. A BRIEF DESCRIPTION OF THE DRAWINGS

FIG. 3 shows alternate embodiments of the line adjustment means.

FIG. 4 shows a further alternate embodiment of the line adjustment means.

FIG. 6 shows an alternate embodiment of the ramp.

FIG. 8 shows an alternate manner of utilizing a particular embodiment of the ramp.

IV. DETAILED DESCRIPTION OF THE PREFERRED EMBODIMENTS

A vehicle payload conveyance system located inside the hollow of a vehicle gate which provides ramps which deploy and can be positioned for the loading and unloading of a payload into or out of the vehicle, and can further provide a cable deployed from the hollow of the vehicle gate which can be attached to the payload and adjustably tensioned to facilitate transfer of a payload into or out of the vehicle.

Figure 1:
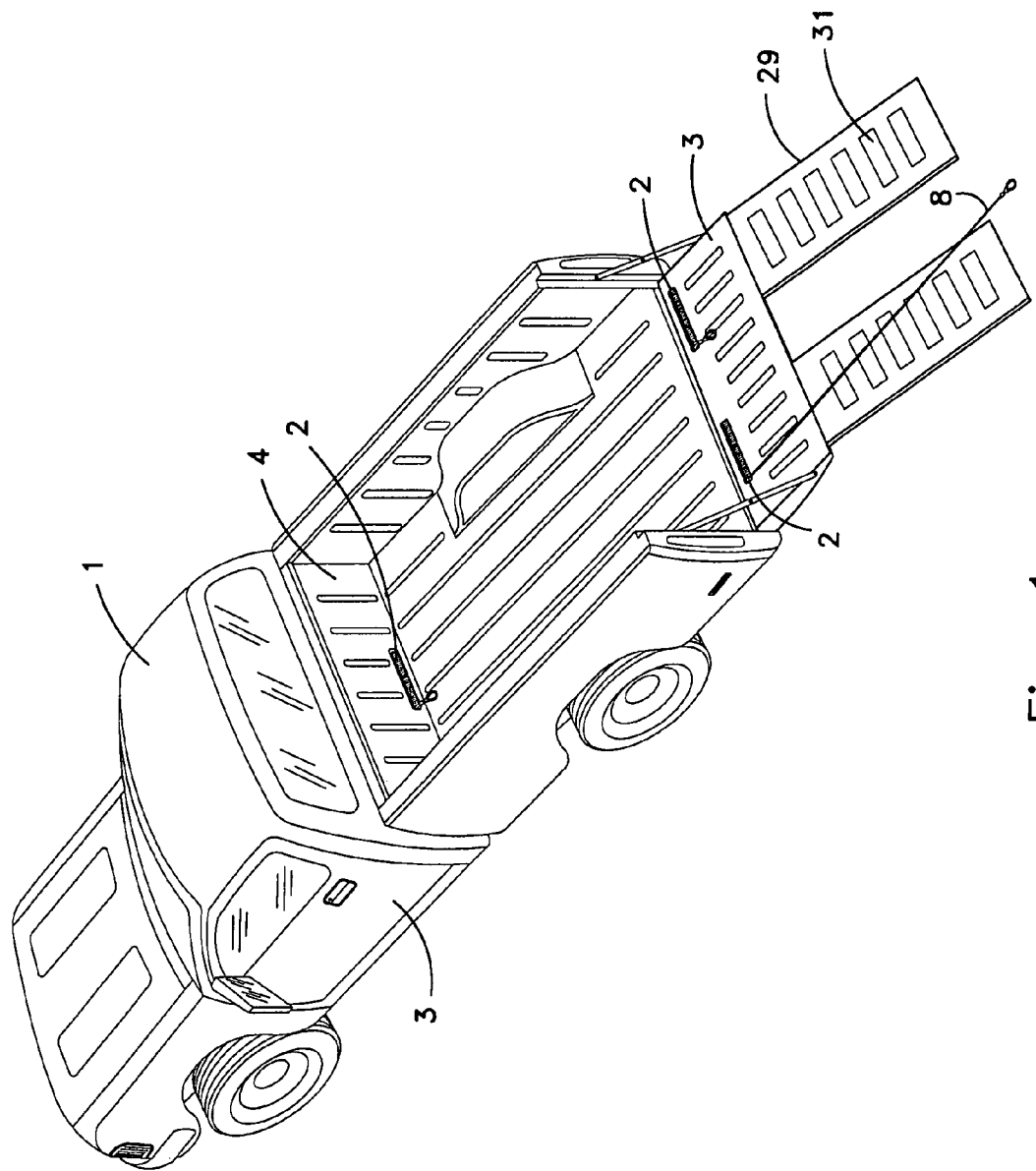
FIG. 1 shows particular embodiment of the payload conveyance invention including a vehicle having a gate with a line adjustment means located inside.

First referring primarily to FIG. 1 which provides, in accordance with the invention, a vehicle (1) having a line adjustment means (2) located inside a gate (3). As utilized in accordance with the invention the vehicle (1) can be a sport utility vehicle, a light utility vehicle, or a pick up truck as shown by FIG. 1; however, it is to be understood that the pick up truck shown in FIG. 1 is meant to be illustrative of the numerous and varied vehicles which are encompassed by the payload conveyance system invention including but not limited to sport utility vehicles, light utility trucks, station wagons, jeeps, passenger cars, or the like.

The gate (3) into which the various components of the payload conveyance system can be incorporated include, but are not limited to a tail gate (3) of a pickup truck (1) as shown by FIG. 1. However, alternate embodiments of the invention, can incorporate components of the payload conveyance system into the gate of the various vehicles above-described, or even the back wall (4) of the bed of a truck as shown by FIG. 1. The gate (3) can operate in the conventional manner between an open position and a closed position to provide ingress or egress from an area of the vehicle, such as, the cabin, the box of a pick up truck, a storage area, or the like. Alternately, the gate can operate solely to position the line adjustment means (2) for use in transferring a payload into or off from a vehicle (1) or a trailer towed by the vehicle (1).

Figure 2:
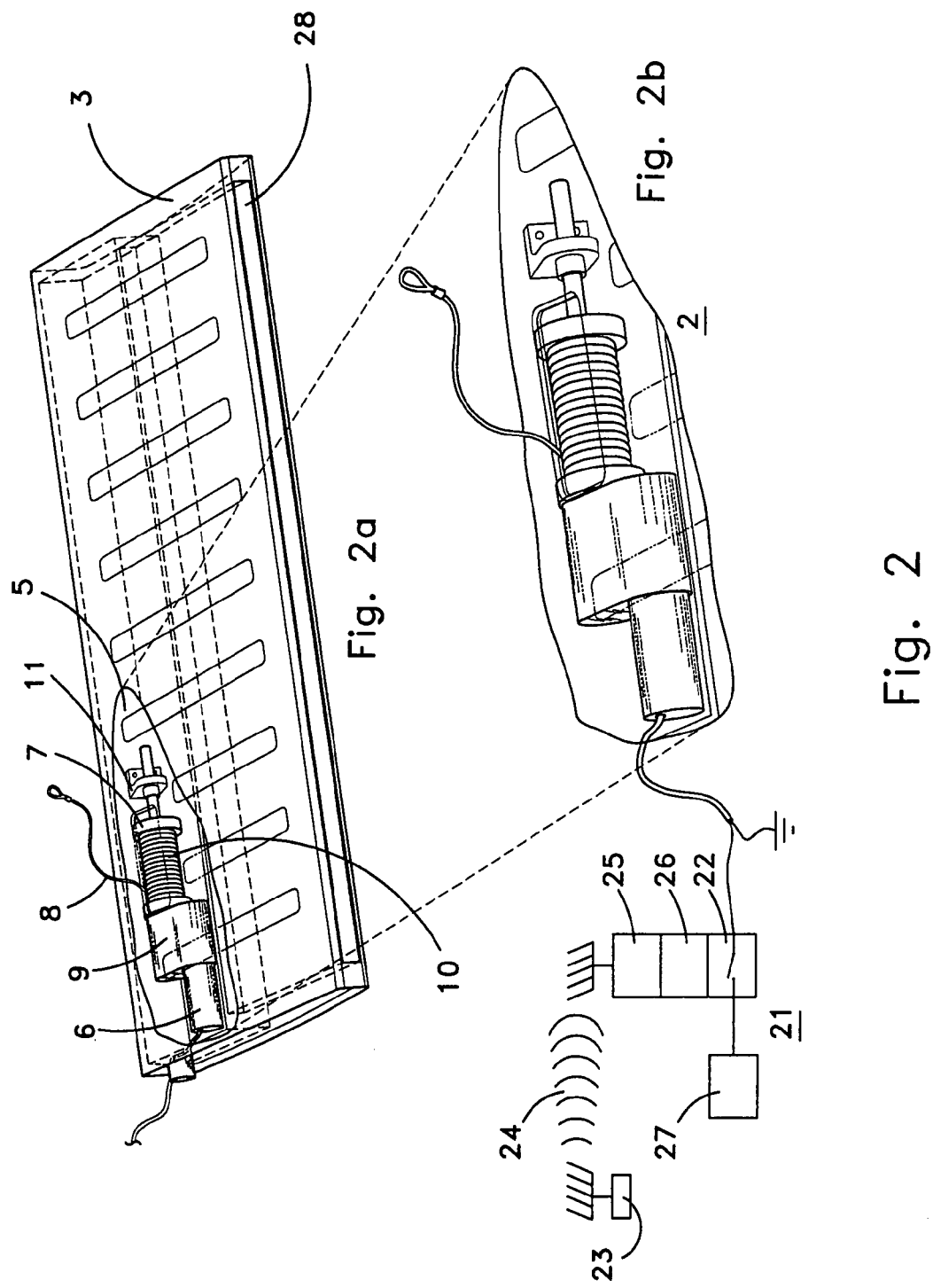
FIG. 2 shows a particular embodiment of the line adjustment means.

Now referring primarily to FIG. 2, the gate (3) can provide a first hollow (5) in which one or more line adjustment means (2) can be located. As to certain embodiments of the invention, the line adjustment means (2) can be configured to retrofit inside the gate (3) of a conventional vehicle (1), such as the hollow (5) within the tailgate (2) of a conventional pickup truck (1) not sold with the vehicle payload conveyance system.

Now referring primarily to FIGS. 2, 3, and 4, the line adjustment means (2) generically comprises a drive means (6), such as an electric motor, reciprocating engine, a manual crank, or the like, coupled to a line take up element (7) having a surface on which a line (8) can be wound. As shown by FIG. 2, a non-limiting example of the line adjustment means (2) includes, an electric motor (6) coupled to a transmission (9) which transmits power to a reel (10a) rotationally journalled in one or more bearings (11). Operation of the electric motor rotates the reel (10a) at a rate determined by the power transmission ratio of the transmission (9) which can be a single ratio, a plurality of selectable independent ratios, or a continuously variable ratio, of mated toothed gears, sheaves and mated belts, or the like. Rotation of the reel (10) winds the line (8) in a single layer or multiple layers upon the surface of the reel (10a).

Alternately, the line take up element (7) can include the drive means (6), the transmission (9), and a shaft (10) (whether a hollow shaft, a solid shaft, a spindle, an axle, or other cylindrical configuration having a surface on which the line (8) can be wound). As shown by FIG. 3, the shaft (10) can also have a surface which varies or has alternate configurations to affect the manner in which the line (8) winds. As shown by FIG. 3a, certain embodiments of the invention can have a shaft (10) which provides a first portion (12) having a first diameter and a second portion (13) having a second diameter, and a third portion (14) having a third diameter, or more portions as desired. Alternately, as shown by FIG. 3b, the shaft (10) can provide a taper (15) which provides a continuous or graded reduction in the diameter of the shaft (10) between a first end and a second end. Numerous and varied configurations of the surface on which the line (8) winds are possible to achieve a desired variation in the rate of speed at which the line (8) is wound or desired application of power to line (8). As such, the configuration of the surface on which the line (8) is wound can be altered to match the speed and power requirements of a particular application.

Now referring to FIGS. 2, 3, and 4, the line (8) can be configured to wind as a single layer upon the surface of the shaft (10) as shown by FIGS. 3a, 3b, 4a, and 4b. By winding the line (8) on the surface of the shaft (10) in a single layer the line adjustment means (2) can have a smaller external configuration for more ready location in the hollow (5) of the gate (3). Further reduction in external configuration of the line adjustment means (2) can be accomplished by utilizing line (8) of the smallest diameter which provides sufficient strength for a particular application. Where the hollow (5) inside the gate (3) provides sufficient space, the line (8) can be wound in multiple layers on the surface of the shaft (10), or on a reel (10a) as shown by FIGS. 2a and 2b.

Various types of line (8) can be utilized with the invention. Several non-limiting examples include, a cable of multiple metal strands having a diameter of between about three sixty fourths of an inch and one quarter inch whether made from stainless steel or galvanized steel whether twisted or braided; or can be a cord of nylon, polypropylene, polyethylene, polysteel, or Kevlar® strands having a diameter of between about one sixteenth of an inch and about one quarter of an inch; or can be a combination of various types or kinds of metal, plastic, carbon fiber, or other fibers or strands, in various combinations and permutations. The selection of the type of line, cord, cable, rope, twine, or the like can be matched to the application to provide the correct level of strength, elasticity, resistance to ultraviolet light, resistance to chemical compounds, or the like, as desired.

Again referring primarily to FIGS. 3 and 4, the line adjustment means (2) can further comprise a line guide (16) which travels in relation to the longitudinal axis of the shaft (10) to position the line (8) in a single layer of adjacent windings on the surface. Or as shown in FIGS. 3a and 3b, the line guide (16) positions the line (8) at the desired location on the surface of the shaft (10) to take advantage of the line uptake speed or line uptake power peculiar to winding the line (8) on that portion of the shaft (10).

Now referring to FIG. 4, as to certain embodiments of the line guide (16), the line guide aperture (39) and the shaft (10) can have mated spiral threads (18). As the shaft (10) rotates, the line guide (16) travels along the surface of shaft (10) at a rate determined by the thread pitch and the shaft (10) rotation rate. The pitch of the mated spiral threads (18) can be adjusted such that the rate of travel of the line guide (16) upon the surface of the shaft (10) results in the desired number of windings of the line (8) per unit distance along the shaft (10).

Now again referring primarily to FIGS. 3a and 3b, the shaft (10) and the line guide (16) can operate independent of the other. As shown, a line guide transmission (17) can operate an independent line guide locator (18) to position the line guide (16) at a location to wind the line (8) on a corresponding portion of the shaft (10). Because the line guide locator (18) operates independent of the shaft (10), the windings per unit distance along the shaft (10) can be varied as the line (8) is taken up. If desired, the line can be wound in multiple layers on a portion of the shaft (10), or in a single layer on a portion of the shaft (10), or can be wound upon a first portion of the shaft (12) for a first duration of time and wound upon a second portion of the shaft (13) for a second duration of time, or the like.

Again referring to FIG. 4b, embodiments of the invention can further provide one or more line guide tracks (19). The line guide tracks (19) can be used to reduce the transmission of force from the line (8) to the shaft (10) and to prevent rotation of the line guide (16) about the axis of the shaft (10).

Figure 5:
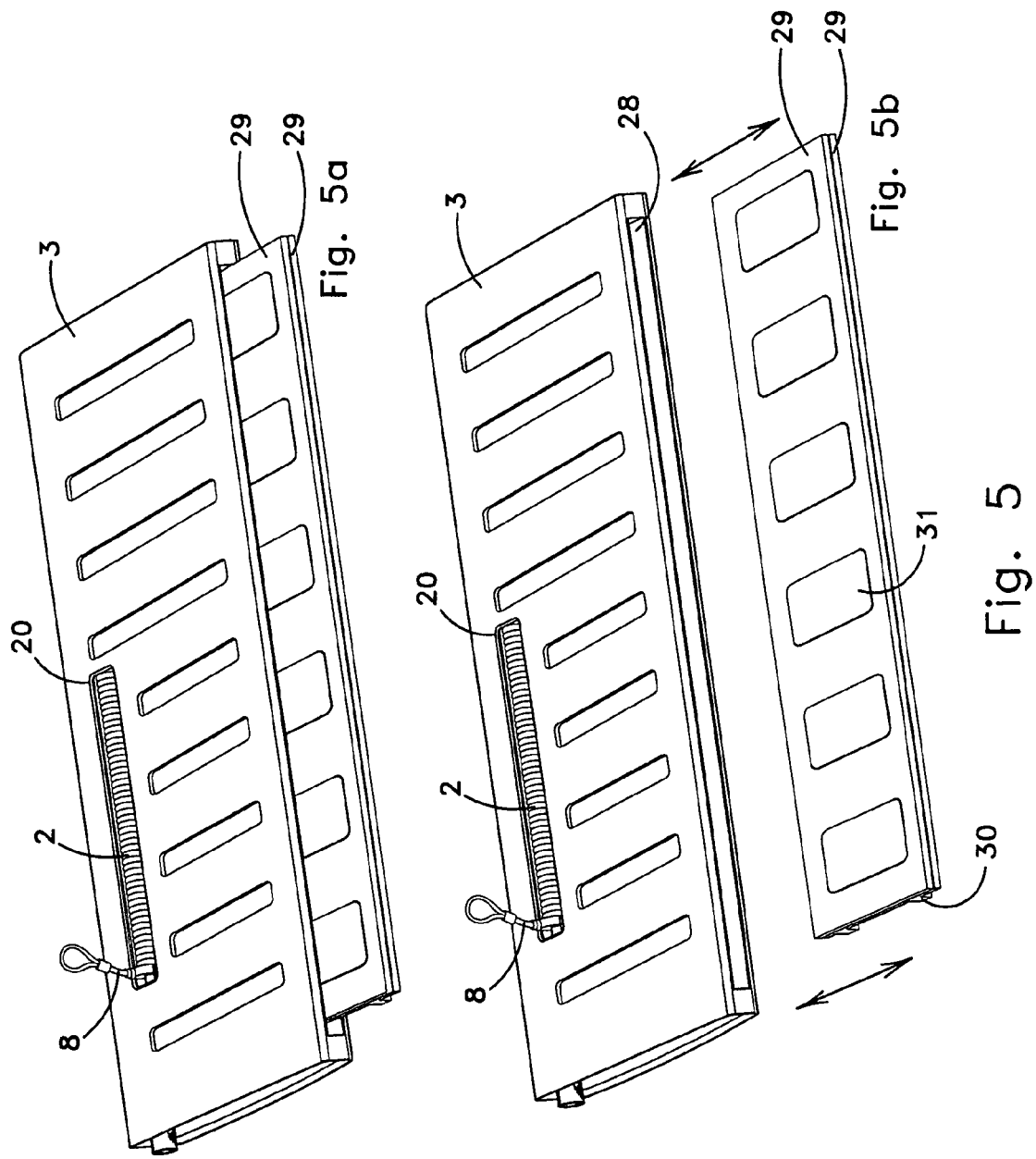
FIG. 5 shows a particular embodiment of the payload conveyance invention including a vehicle having a gate with a line adjustment means located inside and further including a second hollow inside the gate in which a ramp can be stowed.

Now referring primarily FIG. 5, the line (8) can pass through an aperture element (20) which communicates between the inside of the gate (3) and the outside of the gate (3). The aperture element (20) can be configured to allow the line (8) to be unwound from the shaft (10) and adjusted to the desired length outside the gate (3) and then again wound upon the shaft (10) to adjust the desired length outside the gate (3). Based on the numerous configurations of the line adjustment means (2), the shaft (10), the line (8), and the layers of line wound upon the shaft, the aperture element (20) can take numerous and varied configurations which allows the line (8) to be extended, attached to payload or other object, and then retracted or extended to facilitate movement of the payload for loading or unloading the vehicle or trailer towed by the vehicle (1).

Again referring primarily to FIG. 2, alternate embodiments of the invention can further include a controller (21) electronically coupled to the line adjustment means (2). The electronic controller (21) can generically provide a switch (22) to close a circuit to activate the drive means (6). As to basic embodiments of the invention, the controller (21) can include a switch (22) manually operated (push button, foot pedal, lever, rocker, toggle, or the like) to close a hard wire circuit. As to more complex embodiments of the invention, the controller (21) can further include a discrete transmitter (23) which generates a signal (24) to a receiver (25) which operates a switch closure (26). A power source (27), such as a battery, or an alternator, or generator (whether independent of the vehicle (1) or integral to the vehicle (1)) can be used to power the drive means (6) and the controller (21).

Again referring to FIG. 5, the payload conveyance system can further include at least one ramp (29) which stows inside the gate (3). As shown by FIGS. 2 and 5, a second hollow (28) inside the gate (3) can be configured to slidably engage one or more ramps (29). The ramp(s) (29) can be made from metal (sheet or cast), plastic (sheet or cast), or a combination of both, to generate a substantially rectangular geometry configured to stow inside the gate (3). The ramp(s)(29) can further include stiffener elements to increase the strength of the ramp(s) (29). The stiffener elements can be incorporated into the surface of the ramp(s) (29) as corrugations, or the like; or where the ramp (29) has a hollow interior, the stiffener elements can be incorporated inside as foam polymer, strips of sheet metal, corrugated metal, or the like. Certain basic embodiments of the invention, can further include one or more hook(s)(30) to removably couple the ramp (29) to the gate (3) during use. The ramp (29) can further include one or more tread(s) (31) which increase the amount of friction between the ramp (29) surface and the surface of another object. The tread(s)(31) can be made integral to the ramp (29) during the manufacture of the ramp (29) by casting, molding, stamping, or otherwise configuring the surface of the ramp (29) to include friction enhancement elements, such as, dimples, perforations, cleats, grooves, or the like. The tread (s)(31) could also be configured as a layer of material applied to the ramp (29) as a separate component, such as, a sheet of material impregnated with particles with a second adhesive layer to affix the tread (31) to the ramp (29).

Now referring primarily to FIG. 6, the ramp (29) can further include a ball joint (32) which provides a ball (33) that rotates in a socket (34). As a non-limiting example, the ball joint (32) can be coupled to the perimeter of the ramp (29) at one end as shown in FIGS. 6a, 6b, 6c, 6d. The ball joint (32) could also be connected at any position along the perimeter of the ramp (29) to provide the desired utility (for example, a shelf which extends from the gate (3)). The ball (33) and the socket (34) can be configured to allow a portion of the surface of the ball (33) to extend sufficiently beyond the surface of the socket (34) to travel substantially unobstructed within a track (35). The track (35) can be configured to allow travel of the ball (33) a desired distance to deploy and position the ramp(s) (29) for desired applications. As to certain embodiments of the invention, the track (35) can be integral to gate (3) by configuring the opposed sheet material surfaces to produce opposed grooves (36) each of which slidably engage a portion of the ball (33) which extends beyond the surface of the socket (34). Alternately, the track (35) slidly engaged to the portion of the ball (33) which extends beyond the ball joint (32) can be assembled separately and inserted inside the hollow (28) of the gate (3).

As to certain embodiments of the invention as shown by FIG. 6a, the ball joint (32) can be coupled to the ramp (29) at an angle which allows the ball (33) to slidably engage the track (35) while locating a first ramp (29) at one side of the hollow (28) within the gate (3). A second ramp (29) can then be located adjacent to the first ramp (29) in the hollow (28) within the gate (3) with the corresponding ball joint (32) coupled at an angle to slidly engage the corresponding track (35). As to this embodiment of the invention, the first ramp (29) can be rotated on the axis of the ball (33) to remove the first ramp (29) from the hollow (28) inside the gate (3). Similarly, the second ramp (29) can be rotated on the axis of a corresponding second ball (33) to remove the second ramp (29) from the hollow (28) inside the gate (3). Each ramp (29) can then be positioned along the width of the gate (3) by travel of the ball (33) within the corresponding track (35). Alternate embodiments of the invention, can have the track (35) configured to release the ball (33) from the track (35) so that the ramp(s) (29) can be used independent of the vehicle (1), or allowing the ramp (29) to be turned over and re-engaged with the track (35) allowing the ramp (29) to be utilized as an horizontal extension of the gate (3).

Again referring primarily to FIG. 6, the ramp can further include a grip (37). As a non-limiting example, the grip (37) can be configured as a handle having a handle aperture element (38). Alternately, embodiments of the grip (36) can comprise a cord attached to the ramp (29), indentations made in the surface of the ramp (29), or a projection element which extends from a stowed position within the ramp (29).

Figures 7, 7A, 7B:
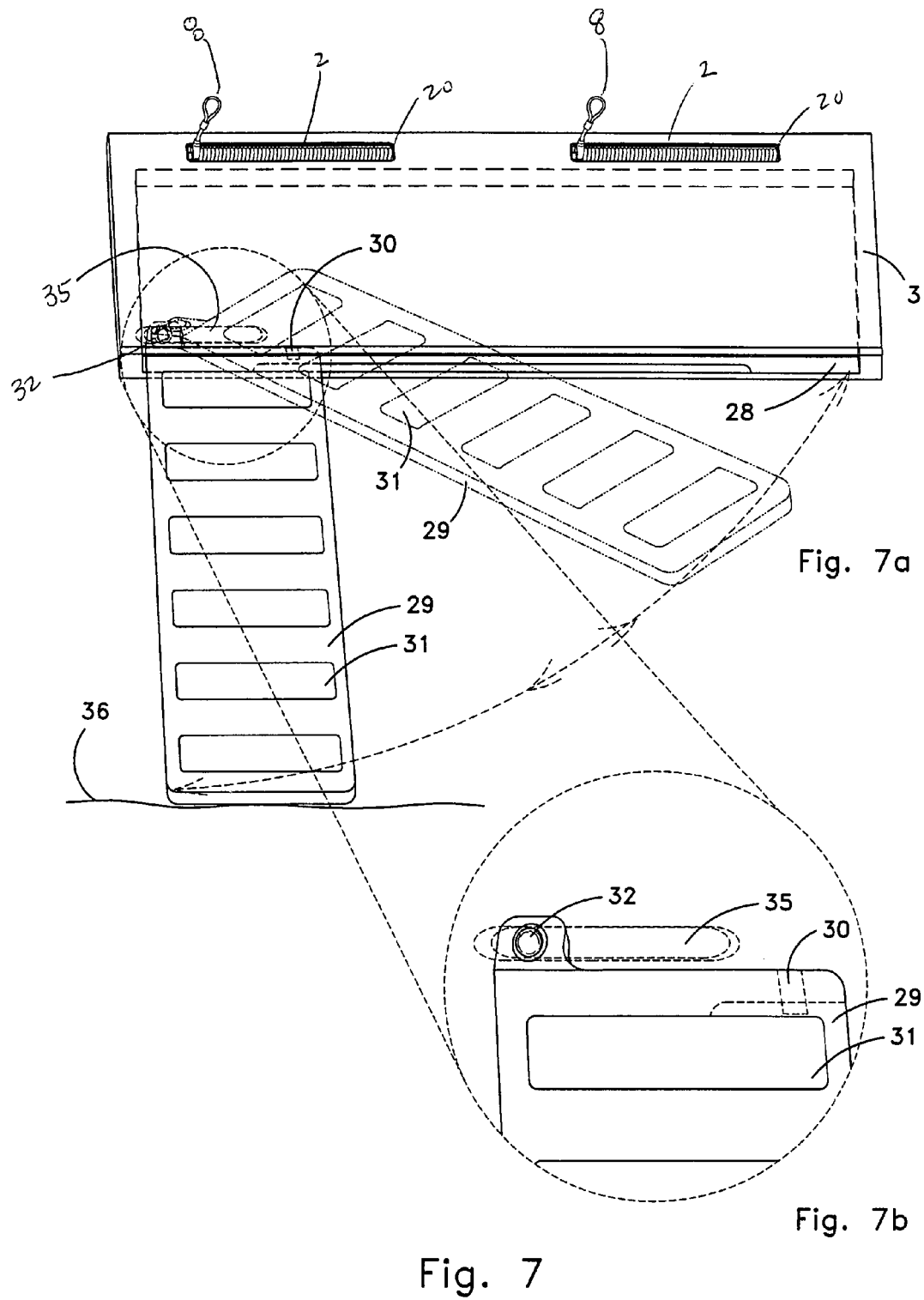
FIG. 7 shows a manner of utilizing a particular embodiment of the ramp.

Now referring primarily to FIG. 7, the ball joint (32) can be located at a position within the ball joint track (32) and the ramp (29) can rotate about the axis provided by the ball (33). Rotation of the ramp (29) about the axis of the ball (33) and travel of the ball (33) within the track (35) allows the ramp (29) to be moved from a position within the second hollow (28) of the gate (3) and lowered to engage a support surface (36). Based upon the configuration of the track (35) and the location of the ball joint (35) on the perimeter of the ramp (29), the ramp (29) can have movement matched to the desired application.

Now referring primarily to FIG. 8, the track (35) can be configured to allow a pair of ramps (29) sufficient travel to abut at the center of the gate (3). Further positioning of the ball (33) within the track (35) can establish the pair of ramps (29) at a desired distance apart. Additionally, the end of each ramp (29) can be rotated about the axis of the ball (33) to locate ramp (29) on the support surface (36) at an angle relative to the gate (3), as shown by FIG. 8b.

The payload conveyance system invention can be utilized by apportioning a length of line (8) between the inside of the gate (3) and the outside of the gate (3) by operation of the line adjustment means (2) located in the hollow (5) of the gate (3). The line (8) can then be attached or coupled to a payload or object and tensioned to assist in transfer of the payload by operation of the line adjustment means (2) to reduce the length of the line (8) or extend the length of the line (8) between the gate (3) and the object.

The ramp (29) stowed inside the second hollow (28) of the gate (3) can be withdrawn and positioned to engage a first end of the ramp (29) with the support surface (36) and to engage a second end with the gate (3). The payload or object to which the line (8) is attached can then be drawn along the ramp (29) (as to some embodiments into the bed of a truck (1)) by operation of the line adjustment means to further reduce the length of the line (8) between the gate (3) and the payload or object.

As can be easily understood from the foregoing, the basic concepts of the present invention may be embodied in a variety of ways. The invention involves numerous and varied embodiments of a vehicle payload conveyance system and methods of making and using such payload conveyance system.

As such, the particular embodiments or elements of the invention disclosed by the description or shown in the figures accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "grip" should be understood to encompass disclosure of the act of "gripping"—whether explicitly discussed or not—and, conversely, were there effectively disclosure of the act of "gripping", such a disclosure should be understood to encompass disclosure of a "grip" and even a "means for gripping" Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

Thus, the applicant(s) should be understood to claim at least: i) each of the vehicle payload conveyance systems herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The claims set forth in this specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth below are intended describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A vehicle, comprising:
   a. a gate connected to said vehicle which operates between an open position and a closed position; and
   b. at least one ramp having a first ramp end and a second ramp end, said at least one ramp having only one ramp pivot coupled proximate said first ramp end, said ramp pivot configured to travel within a track located in a hollow inside of said gate, and wherein said ramp pivot which travels within said track has a configuration which allows said second ramp end to rotate about said ramp pivot between a location within said hollow inside of said gate and a location outside of said hollow inside of said gate, and wherein said ramp pivot which travels within said track has a configuration which further allows rotation of said second ramp end about said ramp pivot to contact a support surface.

2. The vehicle as described in claim 1 wherein said track located in said hollow inside of said gate comprises surfaces of said gate configured to provide opposed grooves each of which engage a part of said ramp pivot coupled to said at least one ramp.

3. The vehicle as described in claim 2, wherein said at least one ramp comprises a first ramp and a second ramp each coupled to a corresponding one said ramp pivot.

4. The vehicle as described in claim 3, wherein each one said ramp pivot correspondingly couples to each of said first ramp and said second ramp at an angle which allows said first ramp and said second ramp to stow adjacent in said hollow inside of said gate.

5. The vehicle as described in claim 3, wherein said track has a configuration which allows sufficient travel of each of said first ramp and said second ramp in the extended position to abut.

6. The vehicle as described in claim 5, wherein said ramp pivot has a configuration which allows removal of said ramp pivot from said track.

7. The vehicle as described in claim 2, wherein said ramp pivot comprises a ball which rotates within a socket.

8. The vehicle as described in claim 7, wherein a part of said ball which rotates within said socket engages said track located in said hollow inside of said gate.

9. The vehicle as described in claim 2, further comprising a grip coupled proximate said second ramp end.

10. The vehicle as described in claim 1, further comprising a line adjustment means having a location within said hollow inside of said gate in which said at least one ramp stows, said line adjustment means comprising:
    a. an aperture element coupled to said gate which communicates between said second hollow inside of said gate and the outside of said gate;
    b. a line which passes through said aperture element of said gate; and
    c. said line adjustment means having said location within said inside said second hollow of said gate which operates to adjust the length of said line outside of said gate.

11. A vehicle as described in claim 10, wherein said line adjustment means having said location within said inside hollow of said gate comprises a shaft rotationally journalled to at least one bearing means located within said inside hollow of said gate, and wherein said line responds to rotation of said shaft to adjust length of said line outside of said gate.

12. A vehicle as described in claim 11, further comprising a drive means coupled to said shaft, wherein said drive means operates to rotate said shaft rotationally journalled to said at least one bearing means.

13. A vehicle as described in claim 12, further comprising a line guide which travels axially on said shaft to wind said line upon said shaft.

14. A vehicle as described in claim 13, further comprising mated spiral threads between said shaft and said line guide, wherein rotation of said shaft generates travel of said guide axially on said shaft.

15. A vehicle as described in claim 14, further comprising a line guide track which engages said line guide to prevent rotation of said line guide about said shaft.

16. A vehicle as described in claim 15, further comprising a controller having a switch which upon closure activates said line adjustment means.

17. A vehicle as described in claim 16, further comprising a discrete transmitter which generates a signal received by said controller to close said switch.

18. A vehicle as described in claim 17, wherein said aperture element coupled to said gate which communicates between said inside hollow of said gate and the outside of said gate has a location which allows said line to draw an object up said at least one ramp having a first ramp end in contact with said gate and a second ramp end in contact with said support surface.

19. A method of assembling a vehicle, comprising the steps of:
    a. connecting a gate to a vehicle which operates between an open position and a closed position; and
    b. providing at least one ramp having a first ramp end and a second ramp end, said at least one ramp having only one ramp pivot coupled proximate said first ramp end, said ramp pivot configured to travel within a track located in a hollow inside of said gate, and wherein said ramp pivot which travels within said track has a configuration which allows said second ramp end to rotate about said ramp pivot between a location within said hollow inside of said gate and a location outside of said hollow inside of said gate, and wherein said ramp pivot which travels within said track has a configuration which further allows rotation of said second ramp end about said ramp pivot to contact a support surface.

20. A method of assembling a vehicle as described in claim 19, configuring surfaces of said gate to provide opposed grooves each of which engage a part of said ramp pivot coupled to said at least one ramp.

21. A method of assembling a vehicle as described in claim 20, further comprising the step of coupling each said ramp pivot to each said at least one ramp at an angle which allows a first ramp and a second ramp to stow adjacent in said hollow inside of said gate.

22. A method of assembling a vehicle as described in claim 21, wherein said step of coupling each said ramp pivot to each said at least one ramp, comprises the step of coupling a socket to said at least one ramp, wherein a ball rotates in said socket to allow travel in said track located in said hollow inside of said gate.

23. A method of operating a gate of a vehicle, comprising the steps of:
    a) generating travel in only one ramp pivot coupled proximate a first ramp end within a track located in a hollow inside of said gate,
    b) rotating a second ramp end about said ramp pivot between a location within said hollow inside of said gate and a location outside of said hollow inside of said gate; and
    c) rotating said second ramp end about said ramp pivot to allow said second end of said ramp to contact a support surface.

24. A method of operating a gate of a vehicle as described in claim 23, wherein said at least one ramp comprises a first ramp and a second ramp configured to stow in adjacent relation in said hollow inside of said gate.

* * * * *